(12) United States Patent
Lei et al.

(10) Patent No.: US 7,310,647 B2
(45) Date of Patent: Dec. 18, 2007

(54) COLUMN MASKING OF TABLES

(75) Inventors: Chon Hei Lei, Alameda, CA (US);
Daniel Manhung Wong, Sacramento, CA (US); Thomas Keefe, Mill Valley, CA (US); Kristy Browder Edwards, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 318 days.

(21) Appl. No.: 10/763,583

(22) Filed: Jan. 23, 2004

(65) Prior Publication Data

US 2005/0144176 A1    Jun. 30, 2005

Related U.S. Application Data

(60) Provisional application No. 60/532,526, filed on Dec. 24, 2003.

(51) Int. Cl.
*G06F 17/30* (2006.01)
(52) U.S. Cl. .................................. 707/101; 707/200
(58) Field of Classification Search ............... 707/1–6, 707/100–205
See application file for complete search history.

(56) References Cited

U.S. PATENT DOCUMENTS

| | | | |
|---|---|---|---|
| 5,133,075 A | 7/1992 | Risch | |
| 5,241,305 A | 8/1993 | Fascenda et al. | |
| 5,265,221 A | 11/1993 | Miller | |
| 5,276,901 A | 1/1994 | Howell et al. | |
| 5,335,346 A * | 8/1994 | Fabbio | 711/163 |
| 5,428,778 A | 6/1995 | Brookes | |
| 5,499,368 A | 3/1996 | Tate et al. | |
| 5,659,738 A * | 8/1997 | Letkeman et al. | 707/102 |
| 5,748,899 A | 5/1998 | Aldrich | |
| 5,751,949 A | 5/1998 | Thomson et al. | |
| 5,765,154 A | 6/1998 | Horikiri et al. | |
| 5,787,428 A | 7/1998 | Hart | |
| 5,815,574 A | 9/1998 | Fortinsky | |

(Continued)

FOREIGN PATENT DOCUMENTS

EP    1 089 194 A2    4/2001

(Continued)

OTHER PUBLICATIONS

International Preliminary Examining Authority, "Written Opinion", PCT/US2003/041541, mailing date Sep. 1, 2005, 6 pages.

(Continued)

*Primary Examiner*—John Cottingham
*Assistant Examiner*—Cheryl Lewis
(74) *Attorney, Agent, or Firm*—Hickman Palermo Truong & Becker LLP

(57) ABSTRACT

Returning rows having column values masked is disclosed. In response to receiving a database command, a modified database command is created that specifies whether to mask a value by returning a mask of the value instead of the value.

In an embodiment, the condition expression is included in a policy function that is referenced by a policy. In an embodiment, the policy determines how the condition expressions are used. The condition expression may be used to determine which column values to mask. The condition expression may also be used to filter which rows are returned.

18 Claims, 2 Drawing Sheets

U.S. PATENT DOCUMENTS

| | | | |
|---|---|---|---|
| 5,832,226 A | 11/1998 | Suzuki et al. | |
| 5,848,408 A | 12/1998 | Jakobsson et al. | |
| 5,864,842 A | 1/1999 | Pederson et al. | |
| 5,940,818 A | 8/1999 | Malloy et al. | |
| 5,963,932 A | 10/1999 | Jakobsson et al. | |
| 6,026,388 A | 2/2000 | Liddy et al. | |
| 6,035,298 A * | 3/2000 | McKearney | 707/10 |
| 6,098,081 A | 8/2000 | Heidorn et al. | |
| 6,134,549 A * | 10/2000 | Regnier et al. | 707/9 |
| 6,253,203 B1 * | 6/2001 | O'Flaherty et al. | 707/9 |
| 6,275,824 B1 | 8/2001 | O'Flaherty et al. | |
| 6,275,825 B1 | 8/2001 | Kobayashi et al. | |
| 6,308,273 B1 | 10/2001 | Goertzel et al. | |
| 6,363,387 B1 | 3/2002 | Ponnekanti et al. | |
| 6,449,609 B1 | 9/2002 | Witkowski | |
| 6,487,552 B1 | 11/2002 | Lei et al. | |
| 6,493,722 B1 | 12/2002 | Daleen et al. | |
| 6,539,398 B1 | 3/2003 | Hannan et al. | |
| 6,578,037 B1 | 6/2003 | Wong et al. | |
| 6,587,854 B1 * | 7/2003 | Guthrie et al. | 707/9 |
| 6,609,121 B1 | 8/2003 | Ambrosini et al. | |
| 6,618,721 B1 | 9/2003 | Lee | |
| 6,631,371 B1 | 10/2003 | Lei et al. | |
| 6,678,822 B1 | 1/2004 | Morar et al. | |
| 6,684,227 B2 | 1/2004 | Duxbury | |
| 6,757,670 B1 | 6/2004 | Inohara et al. | |
| 6,847,998 B1 | 1/2005 | Arcieri et al. | |
| 6,920,457 B2 | 7/2005 | Pressmar | |
| 6,986,060 B1 | 1/2006 | Wong | |
| 6,996,557 B1 | 2/2006 | Leung et al. | |
| 7,117,197 B1 | 10/2006 | Wong et al. | |
| 2001/0021929 A1 | 9/2001 | Lin et al. | |
| 2002/0095405 A1 | 7/2002 | Fujiwara | |
| 2003/0014394 A1 | 1/2003 | Fujiwara et al. | 707/3 |
| 2003/0236781 A1 | 12/2003 | Lei et al. | |
| 2003/0236782 A1 | 12/2003 | Wong et al. | |
| 2004/0139043 A1 | 7/2004 | Lei et al. | |
| 2004/0254948 A1 | 12/2004 | Yao | 707/101 |
| 2005/0050046 A1 | 3/2005 | Puz et al. | |
| 2005/0177570 A1 | 8/2005 | Dutta et al. | |

FOREIGN PATENT DOCUMENTS

JP      2002/312220      10/2002

OTHER PUBLICATIONS

Current Claims, PCT/US2003/041541, 3 pages.
Motro, Amihai, "An Access Authorization Model for Relational Databases Based on Algebraic Manipulation of View Definitions," Data Engineering, 1989, XP010015183.
Michael Stonebraker et al., "Access Control in a Relational Data Base Management System by Query Modification," ACM/CSC-ER, 1974, XP-002319462, pp. 180-186.
T.F. Keefe et al., "Secure Query-Processing Strategies," IEEE, No. 3, Mar. 1989, XP 000122365, pp. 63-70.
International Search Authority, "Notification of Transmittal of the International Search Report and the Written Opinion of the International Searching Authority, or the Declaration," International Application No. PCT/US2004/043480, Apr. 22, 2005, 12 pages.

* cited by examiner

COLUMN MASKING OF TABLES

PRIORITY CLAIM

This application is related to and claims domestic priority under 35 U.S.C. § 119(e) from prior U.S. Provisional Patent Application Ser. No. 60/532,526 filed on Dec. 24, 2003 entitled Column Masking of Tables, and naming inventors Chon Hei Lei, Daniel ManHung Wong, Thomas Keefe and Kristy Browder Edwards, the entire disclosure of which is hereby incorporated by reference as if fully set forth herein.

RELATED APPLICATIONS

The present application is related to U.S. application Ser. No. 10/247,323, U.S. Pat. No. 6,631,371 filed Sep. 18, 2002, entitled Database Fine-Grained Access Control, and naming as inventors Chon Hei Lei and Douglas James McMahon, which is continuation of U.S. application Ser. No. 09/167,092, U.S. Pat. No. 6,487,552 filed Oct. 5, 1998, entitled Database Fine-Grained Access Control, and naming as inventors Chon Hei Lei and Douglas James McMahon. The present application is also related to U.S. application Ser. No. 09/589,602, U.S. Pat. No. 6,578,037 filed Jun. 7, 2000, entitled Partitioned Access Control To A Database, and naming as inventors Daniel ManHung Wong, Chon Hei Lei, which is a continuation-in-part of U.S. application Ser. No. 09/872,896, U.S. Pat. No. 6,587,854 filed May 31, 2001, entitled Virtually Partitioning User Data In A Database System, and naming as inventors Christine Pae Guthrie, Jesper Andersen, Chon Hei Lei and Douglas James McMahon. All of the above applications and their respective continuation-in-parts are hereby incorporated in their entirety herein by reference.

FIELD OF THE INVENTION

The invention relates to computer security in general. More specifically, the invention relates to masking data in databases from users that are not entitled to access the data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, whether or not a given approach is prior art, the problems identified with that approach should not be assumed to have been recognized in the prior art.

A database server stores data in one or more data containers, each container contains records, and the data within each record is organized into one or more fields. In a database system that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A database server retrieves and manipulates data in response to receiving a database statement. Typically the database statement conforms to a database language, such as Structured Query Language (SQL). A database statement can specify a query operation, a data manipulation operation, or a combination thereof. A database statement that specifies a query operation is referred to herein as a query. The present invention is not limited to database statements that specify a particular type of operation. However, for the purpose of explanation, embodiments of the present invention are illustrated using queries.

One function of a database server is to control access to database data. Security mechanisms on database servers control what data may be accessed by a query issued by a user. One type of security mechanism is referred as a fine-grained access control mechanism. An example of fine-grained access control is described in U.S. Pat. No. 6,487,552, issued Nov. 26, 2002 to Chon Hei Lei et al, which is incorporated herein by reference in its entirety. Fine-grained access control may be used to grant and/or deny access to one or more rows of a table.

Despite its power and flexibility, fine-grained access control has some drawbacks. For many data access and privacy requirements, it is desirable that rows be returned in a query without the data in certain security sensitive columns. However, fine-grained access control either allows access to the entire row or does not allow access to any part of the row. An approach that may be considered to control access to columns is what shall be referred to as the "view approach". Under the view approach, all access to a table is performed indirectly through a view. Views offer a convenient way to provide column level access control when the users fall into a relatively small number of categories based on security needs. For example, if users are categorized into two categories, then only two views need to be created. However, many access policies require users to be divided into a large number of categories based on multiple criteria. Providing views for a large number of categories may be onerous. Similarly, programming the database applications to use all these views may also be onerous. Furthermore, it is often infeasible to rewrite packaged applications to use the views.

Based on the foregoing, it is desirable to provide column level access control that avoids the pitfalls of the approaches discussed above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for column masking of tables is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Introduction

The column masking of tables provides column level access control by masking the values of columns according to a security policy. The column masking of tables is performed by rewriting queries issued against a database object. The rewritten query specifies whether to mask the columns requested in the original query issued. For example, the query expression is rewritten using a condition expression (e.g., a predicate) under which to mask the column for a particular row. In an embodiment, the condition expression is generated using a fine-grained access control mechanism.

Fine-Grained Access Control Mechanism

Figure 1:
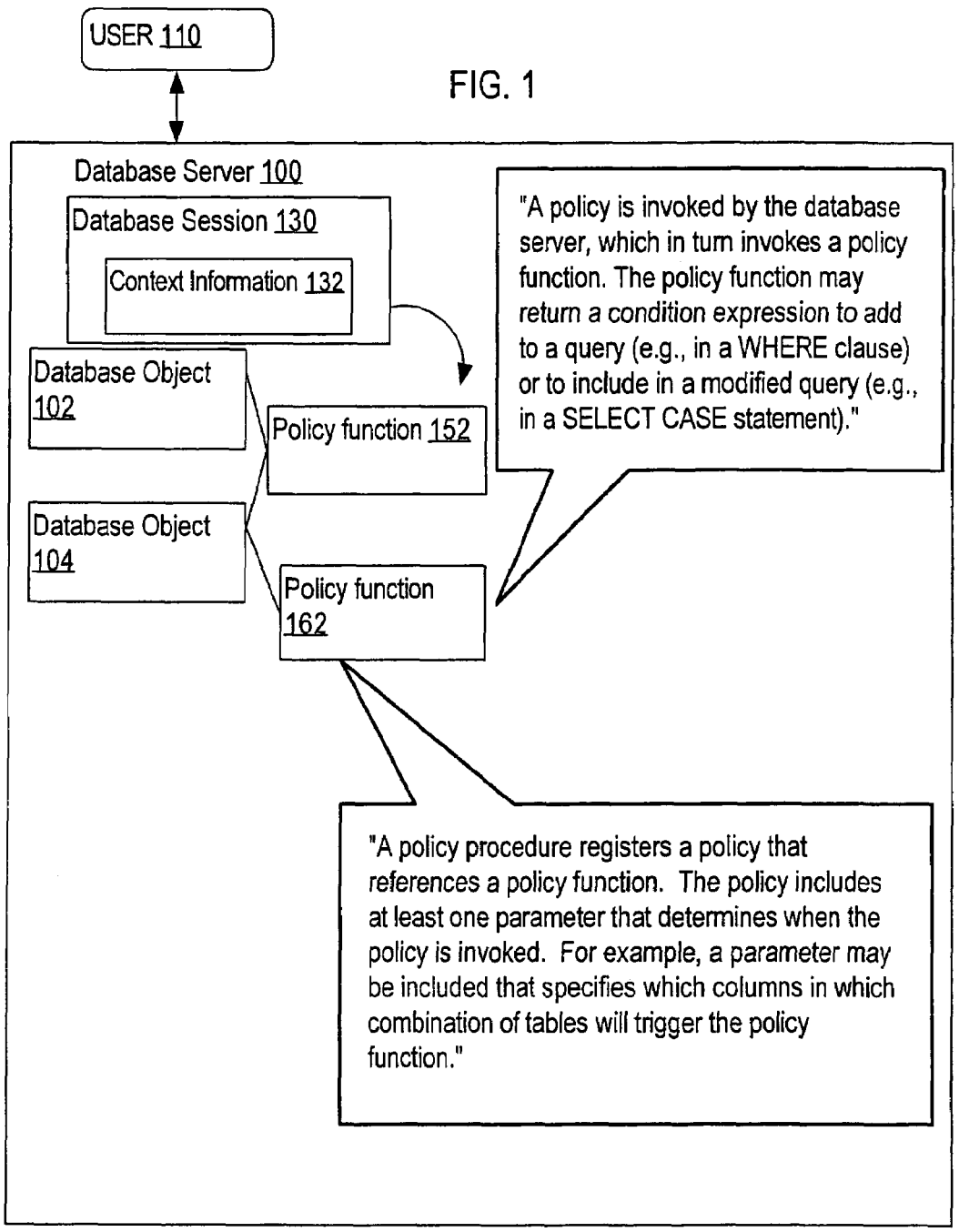
FIG. 1 shows a database server and components used by a fine-grained access control mechanism on the database server, upon which an embodiment of the present invention may be implemented.

FIG. 1 shows a database server 100 and components used by a fine-grained access control mechanism on the database server, upon which an embodiment of the present invention may be implemented. FIG. 1 shows database server 100, which manages access to database objects. A database object may be, for example, a relational or object table, or a view. Among these database objects are database object 102 and database object 104.

User 110 interacts with database server 100 by issuing queries. The results of the queries are computed by database server 100 and returned to user 110. A user may be any type of database client, including one or more processes running on the same or a different computer system as database server 100, and one or more processes executing an application program interface (API) or a user interface through which a user interacts to issue queries.

When user 110 connects to database server 110, a database session 130 is established. If user 110 disconnects from database server 110 and later reconnects to database server 110, a new session is established. A session, such as database session 130, is a particular connection established for a user, such as an application or another database server, through which a series of requests may be made. The requests are carried out by one or more session processes. The requests, which may be in the form of a function or remote procedure invocations, include requests to execute queries, to begin execution of a transaction, to perform updates and other types of transaction operations, to commit or otherwise terminate a transaction, and to terminate a database session.

The database server 130, on which a database session 132 is established, maintains session state data that reflects the current state of database session 132. Among this information is user context information, such as user context information 132. The database session 130 includes context information 132. The context information 132 includes information related to the access privileges of user 110 as well as information related to the present database session.

User context information is data that is maintained by database server 100 and that is associated with a user's database session. Users (such as user 110) may also transmit requests to database server 100 to access and change user context information. The ability of a policy function and user to change context information in this way is subject to constraints that are imposed by database server 100 for security purposes. Context information 132 contains various attributes, such as a user id identifying the user associated with the session.

A fine-grained access control mechanism uses one or more policy functions, such as policy functions 152 and 162, which are associated with a database object (e.g., a table or a view), such as database objects 102 and 104, respectively. The policy function, such as policy function 152 or 162, is invoked, when, for example, a database server (e.g. database server 100) detects that a query is issued against a database object, such as database objects 102 or 104, respectively. The policy function, such as policy function 152 or 162, returns a condition expression. For example, a policy function may return a condition expression that is used by database server 100 as a predicate that is appended to the query to generate a modified query. The predicate restricts access to data according to a logic implemented in one or more of the invoked policy functions 152 or 162. In addition, a policy function, such as policy function 152 or 162, can also modify context information associated with a user, such as context information 132, which can affect subsequent database access control. In this way, user access is transparently restricted by transparently modifying queries issued by users, such as user 110, to limit access to data.

To control access to database objects using a fine-grained access control mechanism, a policy function is associated with the database object so that it is invoked for queries that require access to the table. To this end, database server 100 stores metadata that associates database object 104 with both policy function 152 and 162 and database object 102 with only policy function 152.

When registering a policy function, such as policy function 152 or 162, the user (e.g., user 110) supplies information, via parameters of an administrative procedure, about the policy function. The information about the policy function includes, for example, the database object (e.g., database object 102 or 104) associated with the policy function and one or more columns that the policy function controls access to, as will be described later in greater detail. The term policy refers to a combination of a policy function and metadata, where the metadata describes how the policy function is used to control access to one or more database objects, such as a table or column. Each invocation of the administrative procedure creates (or registers) a policy for a database object. A policy is referred to as being invoked when the policy function is invoked under conditions defined by the policy.

Functional Overview of Various Embodiments of the Invention

In an embodiment, a customer is allowed to provide a policy function as a plug-in module, which returns a condition expression to the database server. When a query is issued that requires access to a column, the database server invokes the policy function, which returns a condition expression. The database server uses the condition expression to rewrite the query so that the query contains logic that masks the column when the condition is not satisfied.

To illustrate, consider a table DEPT and a query Q1. Table DEPT contains columns, entitled deptno, dname and loc, which contain values for a department identifier, department name, and location, respectively. In this example an administrator has created a policy function returning a condition expression 'deptno=10'. Also, the administrator has established a policy referencing this policy function. Database server 100 receives query Q1 as follows.

SQL>select deptno, dname, loc from dept;

In response, datebase server 100 invokes a policy function for deptno, which returns the condition expression 'deptno=10' of the policy function referenced by the policy invoked. Database server 100 rewrites the query as:

select case when deptno=10 then deptno else NULL end, dname, loc from dept;

The query Q1 returns the value of deptno from table DEPT when deptno=10. Otherwise (when deptno is not equal to 10), the value of NULL is returned for deptno.

The column may be masked in a variety of ways. For example, the data may be replaced with nonsense data, such as a string of x's, random data, a user determined function, or null values. The random data may be generated using a random number generator for producing either random numbers or random ASCII character values that are converted into characters. Although any data may replace the data not being provided, an advantage of providing a null value rather than a string of x's, is that the user is less likely to confuse a null value with a program error than to confuse a string of x's with a program error. Alternatively, false data that has a realistic appearance, may allow limited forms of analysis of the data that is not possible with null values. For example, the false data may be concocted in a manner such that it has the same mean and standard deviation as the real data. In this embodiment, the type (e.g., integer, character, logical, floating point) of the mask data should be the same as the data hidden by the mask. The mask data may be returned by a user-defined masking function specified during policy creation. (Although the policy function is invoked at object lookup time to generate the condition, the masking function is called during runtime to generate the mask data.)

In an embodiment, an input parameter of an administrative procedure is used to specify the relevant columns to apply to the policy. The administrative procedure is used to register (e.g., create or add) a policy. The value of the input parameter is specified when registering a policy. The input parameter may be referred to as sec_relevant_cols. In an embodiment, an administrative procedure containing the sec_relevant_cols input parameter registers a policy. The administrative procedure may be referred to as add_policy. To apply a condition expression, such as a predicate, only to specified columns, a policy is registered. If no value is specified for sec_relevant_cols, the policy is applied to all columns. When a value is specified for sec_relevant_cols, by registering the policy, values are passed to the database server, via the input parameter sec_relevant_cols, where the values specify which of the columns to apply to the condition expression. In an embodiment, the policy is not triggered unless the query specifies one of the columns listed in the sec_relevant_cols input parameter. In an embodiment, the add_policy procedure also includes an input parameter that specifies how the condition expression is to be used (e.g., whether the condition expression is used to determine if a column should be masked or whether the condition expression is used to determine which rows to filter out of the query results). In an embodiment, the input parameter specifying how to use the condition expression is referred to as sec_relevant_cols_opts. The sec_relevant_cols_opts input parameter may be used for entering a list of rows that may be viewed. In an alternative embodiments, the sec_relevant_cols_opts input parameter is used for entering a condition expression, method, function, object, or procedure, for example, that determines which rows may be viewed.

Applcation Interface for an Administrative Registration Procedure

The following is an application program interface (API) for an administrative procedure according to an embodiment of the invention, which may have the following input parameters:

object_schema—A schema that owns the database object (e.g., the table and/or view) to which the security policy will be applied. If object_schema has a NULL value, then the value of object_schema is the current user's schema.

object_name—The name of the database object to which the security policy is applied.

policy_name—The name of the policy being created, updated, refreshed, enabled or disabled.

function_schema—The schema of the policy function. In an embodiment, if the function_schema has a NULL value, then the current user's schema is the schema for the policy function.

policy_function—The policy function name. In an embodiment, if the function is defined within a package, then the name of the package must be present.

statement_types—The statement type to which the policy applies. For example, the statement type may be any combination of SELECT, INSERT, UPDATE, and DELETE. In an embodiment, the default statement type is any, so that by default the policy specified by policy_name is applied to all statement types.

update_check—An optional argument for the INSERT or UPDATE statement types. The update_check is a logical variable used to determine whether the policy is checked against updated or inserted values when the values of update_check are entered. In an embodiment, the default value of update check is FALSE. Setting update_check to TRUE causes the server to also check the policy against the value after an insert or update.

enable—Indicates if the policy having the name stored in policy_name is enabled when the policy is added. The default is TRUE, and the policy is enabled when added.

policy_type—Contains the type of the policy (e.g., Static, Static Shared, etc.). In an embodiment, if the policy_type has a NULL value, the policy type is Dynamic.

long_predicate—If long_predicate is false, then an optimization is used to retrieve the predicate quickly from the policy function, taking advantage of the short length of the predicate. In an embodiment, the length of a long predicate is over 4000 bytes (default), and up to, and including 32 k.

sec_relevant_cols—A list of columns to which the security policy is applied. In an embodiment, the relevant columns are defined inside single quotes separated by commas. In an embodiment, the policy function is not triggered unless one or more of the columns specified in the list are referenced by the query.

sec_relevant_cols_opt—This parameter is used to specify one of at least two options. The first option is specified by the value 'dbms_rls.ALL_ROWS', for example, which causes the condition expression of the policy function for the policy to be used to mask columns. Rows that do not satisfy the condition expression are returned, but with the columns specified in sec_relevant_cols masked. Under the second option, a row that does not satisfy the condition expression of the policy function is filtered from the return results. If there are any rows that do not satisfy the condition expression, then a subset of all the rows is returned, where the subset includes only those rows that satisfy the condition expression. In an embodiment, the second condition expression is indicated by setting sec_relevant_col_opts to a NULL value. The filtering of the rows of the second condition is accomplished by adding the condition expression as a predicate condition in the WHERE clause of a query, as explained in U.S. Pat. No. 6,487,552, referenced above in the Background section of this specification.

Syntax of an Embodiment of a Policy Function

An example of a syntax for a policy function is as follows:
FUNCTION policy_function (object_schema IN VARCHAR2, ovject_name VARCHAR2)

```
PROCEDURE add_policy(object_schema IN VARCHAR2 := NULL,
    object_name   IN VARCHAR2,
    policy_name   IN VARCHAR2,
    function_schema IN VARCHAR2 := NULL,
    policy_function IN VARCHAR2,
    statement_types IN VARCHAR2 := NULL,
    update_check IN BOOLEAN := FALSE,
    enable       IN BOOLEAN := TRUE,
    policy_type  IN BINARY_INTEGER := NULL,
    long_predicate BOOLEAN := TRUE,
    sec_relevant_cols IN VARCHAR2 := NULL,
    sec_relevant_cols_opt IN BINARY_INTEGER := NULL);
```

In an embodiment, the policy function and the policy may be compiled in any order with respect to one another as long as the policy function and policy are created before being invoked, respectively. Invoking two or more different policies for the same object may have the combined effect based

```
FUNCTION policy_function (object_schema IN VARCHAR2, object_name VARCHAR2)
         RETURN VARCHAR2
    .
    .
    Lines of code defining the function.
    .
    .
    .
```

Similar to the input parameters for the API, the object_schema is the schema owning the database object, and the object_name is the name of database object that the policy will apply to.

For example, a policy function named srfA may be created by the statements:

```
SQL> CREATE OR REPLACE FUNCTION srfA(oowner IN
VARCHAR2, ojname IN VARCHAR2)
  2 RETURN VARCHAR2 AS
  3 con   VARCHAR2(200);
  4 begin
  5 con := 'deptno >= 1000';
  6 return (con);
  7 end srfA;
  8 /
```

In the above example, the first line assigns the name srfA to the policy function. The input for the function are a schema_object, which is oowner, and an object name, which is obname. Lines 2 and 3 of the policy function establish a return variable, called con, which will store the condition expression of the policy function as a character variable. Line 5 assigns a value of deptno>=1000 to the variable con.

An Embodiment of an Add or Create Policy Procedure

After the policy function is created, an administrative registration procedure is invoked to register the function as the policy for a particular object. In an embodiment, the add_policy procedure creates a fine-grained access control policy to a table or view.

An example of a syntax for the add_policy procedure may be on all the condition expressions of each policy. For example, consider two policies, Px and Py that (1) each have a different value for their respective policy functions, PFx and PFy, (2) do not specify a value for the input parameter sec_relevant_cols_opt, and (3) have the same value for the input parameter sec_relevant_cols. Assume also that policy function PFx returns a condition expression X, and policy function PFy returns a condition expression Y. Then the result of enabling both policies is the same as enabling one policy having a policy function that returns the condition expression X AND Y, which may be inserted into a WHERE clause in a rewritten query. For example, consider a table R with columns s and t with the following rows: {(s0, t0), (s1, t1), (s2, t2), (s3, t3)}. Now, assume that under a policy X that applies predicate Px, the result is: {(NULL, t0), (s1, t1), (NULL, t2), (s3, t3)} and under a policy Y that applies Py the result is: {(s0, t0), (NULL, t1), (NULL, t2), (s3, t3)}. If both policies are applied the result is: {(NULL, t0), (NULL, t1), (NULL, t2), (s3, t3)}.

As another example, consider two policies, Px and Py that each have a different value for their respective policy functions, PFx and PFy, as in the first example. However, in policy Px the value of sec_relevant_cols_opt is dbms_rls.ALL_ROWS, while policy Py does not specify a value for the input parameter sec_relevant_cols_opt. Assume that policy function PFx returns a condition expression X, and policy function PFy returns a condition expression Y. Assume also the policy Px is enabled first, and then policy Py is enabled. Then the result of enabling both policies is the same as applying policy Py to the result obtained by applying policy Px. Specifically, since for policy Px sec_relevant_cols_opt has the value dbms_rls.ALL_ROWS, therefore the condition expression X returned by policy function PFx is used (in a rewritten query) to determine which columns of which rows to mask. The subsequent application of policy Py will use the condition expression Y returned by policy function PFy as a filter to limit which rows to return from the rows found using policy Px.

The add_Policy procedure may have any of a variety of default entries for a variety of the add_policy's parameters. For example, if no input is specified for the sec_relevant_cols_opts input parameter, then the only rows that may be viewed are those that satisfy the condition expression associated with the policy function of the add_Policy procedure. In an embodiment, an input value for sec_relevant_cols_opts may exist that specifies all rows. In an alternative embodiment, if a value is not specified for the sec_relevant_cols_opts input parameter, then all rows may be viewed. Alternatively, if an input value is not specified for sec_relevant_cols_opts, then the policy is applied regardless of whether any of the columns listed in the sec_relevant_cols input parameter are referenced by the query. Alternative embodiments of the administrative procedure for registering the policy may have other input parameters in addition to or instead of those listed above.

An Example of an Interactive Session

Assume that a schema exists for a user by the name of Scott having schema name tkzrlsc0, and that table DEPT includes the following rows.

| DEPTNO | DNAME | LOC |
|---|---|---|
| 100 | RESEARCH | DALLAS |
| 41 | OPERATIONS | BOSTON |
| 10 | ACCOUNTING | NEW YORK |
| 15 | SALES | CHICAGO |

In a non-limiting embodiment commands are enabled by an administrator through a command-line interface to a database server, provided by Oracle, release 10 g (Chapter 13 or Oracle release 10 g Enhancements, is incorporated herein in its entirety). Although an embodiment is illustrated using this Oracle product, the present invention is not so limited. If the administrator would like to establish a policy for table DEPT, the administrator needs to also establish at least one policy function for use by the policy. To establish a first policy function, the following lines may be entered by an administrator.

```
SQL> CREATE OR REPLACE FUNCTION srf1(tkzrlsc0 IN
VARCHAR2, dept IN VARCHAR2)
  2 RETURN VARCHAR2 AS
  3 con   VARCHAR2(200);
  4 begin
  5   con := 'deptno = 10';
  6   return (con);
  7 end srf1;
  8 /
```

The above lines create a policy function having the function_name srf1, which returns the condition expression deptno=10.

To establish a policy that uses the policy function srf1, the following lines may be also entered by the administrator.

```
SQL> begin
  2 dbms_rls.add_policy(object_schema=>'tkzrlsc0', object_name=>
```

-continued

```
     'dept',
  3      policy_name=>'p1', function_schema=>'tkzrlsc0',
  4      policy_function=>'srf1',
  5      sec_relevant_cols=>'deptno',
  6      sec_relevant_cols_opt=>dbms_rls.ALL_ROWS);
  7 end;
  8 /
```

Lines 2-4, above, add policy function srf1 to object_schema 'tkzrlsc0' (belonging to Scott), having function_schema 'tkzrlsc0', object_name 'dept', policy_name 'p1', as determined by the object_schema, function_schema, object_name, policy_name, respectively. According to lines 3 and 4, the policy function srf1 is added to policy p1. The policy p1 is applied to, and triggered by, column 'deptno' and is applied to all rows as determined by the sec_relevant_cols and sec_relevant_cols_opt input parameters of lines 5 and 6.

Assume that the following query, Q2, is received by the database server while the above policy, p1, is enabled.

SQL>select deptno, dname, loc from dept order by dname;

In response, the database server rewrites the query Q2 as:

select case when deptno=10 then deptno else NULL end, dname, loc from dept order by name;

Modified query Q2 selects the columns from the table dept and orders the rows according to the column dname (the department name) similar to original query Q2. The result returned is

| DEPTNO | DNAME | LOC |
|---|---|---|
| 10 | ACCOUNTING | NEW YORK |
|  | OPERATIONS | BOSTON |
|  | RESEARCH | DALLAS |
|  | SALES | CHICAGO |

In the above output of modified query Q2, the three columns selected are displayed, which are deptno, dname, and loc, similar to original query Q2. As a result of line 6, which is sec_relevant_cols_opt=>dbms_rls.ALL_ROWS, all of the rows are displayed. In contrast to original Q2, only the department number for the accounting department satisfies the condition expression, deptno=10 of modified query Q2. Therefore, as a result of using modified query Q2 instead of original query Q2, only the department number 10, for the row of the accounting department is displayed, and the other department numbers are not displayed. Instead of the values listed in the deptno column, NULL values are displayed for the other department numbers.

Now, assume that the administrator would like to further restrict Scott's access to parts of the table DEPT. Accordingly, the administrator may decide to create a second policy function by entering the following lines of PL/SQL.

```
SQL> CREATE OR REPLACE FUNCTION srf2(tkzrlsc0 IN
VARCHAR2, dept IN VARCHAR2)
  2 RETURN VARCHAR2 AS
  3 con   VARCHAR2(200);
  4 begin
  5   con := 'deptno < 40';
```

-continued

```
6   return (con);
7 end srf2;
8 /
```

The above lines create a second policy function having the function_name srf2, which returns the condition expression deptno<40. To make use of the policy function srf2, the administrator may register a second policy by entering the following lines of PL/SQL.

```
SQL> begin
2 dbms_rls.add_policy(object_schema=>'tkzrlsc0', object_name=>
   'dept',
3       policy_name=>'p2', function_schema=>'tkzrlsc0',
4       policy_function=>'srf2',
5       sec_relevant_cols=>'deptno');
7 end;
8 /
```

Lines 2-4, above, add policy function srf2 to object_schema 'tkzrlsc0' (belonging to Scott), having function_schema 'tkzrlsc0', object_name 'dept', policy_name 'p2', as determined by the object_schema, function_schema, object_name, policy_name, respectively. According to lines 3 and 4, the policy function srf2 is added to policy p2. Since sec_relevant_cols_opt was not specified, only the rows satisfying the condition expression of srf2 (policy p2), deptno<40, will be returned in the query to which the policy is applied.

With both of the above two policies (p1 and p2) enabled, assume that Scott submits query Q3, which is SQL>select deptno, dname, loc from dept order by dname;

Query Q3 is the same as Query Q2 except that the query is referred to as Q2 when only policy p1 is enabled and is referred to as query Q3 when both policies p1 and p2 are enabled. In response to receiving query Q3, the database server rewrites original query Q3 as:

select case when deptno=10 then deptno else NULL end, dname, loc from dept order by name where deptno<40;

Similar to modified query Q2, modified query Q3 selects the columns from the table dept and orders the rows according to the column dname (which may be the department name). However, in contrast to modified query Q2, since both policies p1 and p2 are now enabled, modified query Q3 is essentially a combination of the policies p1 and p2. Consequently, only the two rows are selected by modified query Q3 are the rows that satisfy the prediate returned for p2, and the deptno value of those rows that satisfy the condition expression for policy p1. Consequently, the results returned are

| DEPTNO | DNAME | LOC |
|--------|-------|-----|
| 10 | ACCOUNTING | NEW YORK |
|  | SALES | CHICAGO |

Specifically, since policy p2 did not specify the sec_relevant_cols_opt input parameter to select which rows to display, the condition expression of p2, deptno<40, limits the rows displayed to those having a deptno that is less than 40. The only rows having department numbers less than 40 are the rows for the SALES and ACCOUNTING departments. Consequently, only the SALES and ACCOUNTING department rows are displayed. Since policy p1 specifies sec_relevant_cols_opt=>dbms_rls.ALL_ROWS, the department number is not displayed for rows that do not satisfy the condition expression of p1. The only row that satisfies p1 is the ACCOUNTING department row. Consequently, in the two rows displayed, in response to modified query Q3, the deptno is not displayed for the SALES department row, but is displayed for the ACCOUNTING department row. In the SALES department row a NULL value is displayed instead of the deptno value.

Now suppose that Scott decides to submit query Q4, which is

SQL>select dname, loc from dept order by dname;

Query Q4 selects the columns dname and loc from the table DEPT and orders the rows according to the column dname. The results returned are

| DNAME | LOC |
|-------|-----|
| ACCOUNTING | NEW YORK |
| OPERATIONS | BOSTON |
| RESEARCH | DALLAS |
| SALES | CHICAGO |

In the above output (of query Q4) four rows are displayed, which are the same rows as the output of query Q2 (when only policy p1 was enabled). However, in contrast to the output of query Q2, the deptno column is not displayed. In an embodiment, since the add_policy procedures associated with p1 and p2 both specify sec_relevant_cols=>'deptno', neither policy is invoked unless the deptno column is referenced in the query. Consequently, since the query "select dname, loc from dept order by dname" does not reference the deptno column, query Q4 is applied unmodified, and all rows of table DEPT are displayed, in contrast to queries Q2 and Q3. Nonetheless, the security of the deptno column is not in anyway compromised despite policies p1 and p2 not being invoked. Specifically, even though policy p1 and p2 were not invoked by query Q4, the secure values of the column deptno are not displayed, because none of the values of the deptno column are displayed as a result of the deptno column not being referenced. In an alternative embodiment, policy p2 restricts access to any row having a deptno greater than or equal to 40 regardless of which columns are referenced, because no value was specified for sec_relevant_cols_opt input parameter. Therefore, in this alternative embodiment, only the SALES department and ACCOUNTING department rows are displayed.

Now assume that the administrator would like to remove Scott's access restrictions to table DEPT. The administrator may enter the following lines of code.

```
SQL> begin
2 dbms_rls.drop_policy('tkzrlsc0', 'dept', 'p1');
3 dbms_rls.drop_policy('tkzrlsc0', 'dept', 'p2');
```

-continued

```
  4 end;
  5 /
```

Line 2 removes policy p1 from object deptno of object schema tkzrlsc0, and lines 3 removes policy p2 from object deptno of object schema tkzrlsc0. Now assume that the administrator would like to restrict Scott's access of table DEPT to just the ACCOUNTING DEPT row. The administrator may enter the following add_policy procedure, referencing policy function srf1.

```
SQL> begin
  2 dbms_rls.add_policy(object_schema=>'tkzrlsc0', object_name=>
    'dept',
  3        policy_name=>'p1', function_schema=>'tkzrlsc0',
  4        policy_function=>'srf1',
  5        sec_relevant_cols=>'deptno');
  7 end;
  8 /
```

As above, policy function srf1 is added to policy p1. However, this time, since the sec_relevant_cols_opt input parameter was not specified, only rows satisfying the condition expression of srf1 will be displayed. Although both use the same policy name, original policy p1 (which was enabled when query Q2 was submitted) and present policy p1 are different. Now assume that Scott enters query Q5, which is SQL>select deptno, dname, loc from dept order by dname;

Query Q5 is the same as Query Q2, except that the query is referred to as Q2 when only original policy p1 is enabled and is referred to as query Q5 when present policy p1 is enabled. The database server rewrites query Q5 as select deptno, dname, loc from dept order by dname where deptno=10;

Modified query Q5 selects the columns from the table dept and orders the rows according to the column dname (which may be the department name), similar to modified query Q5. In contrast to modified query Q2, modified Query Q5 selects only one row, and has the following output.

| DEPTNO | DNAME | LOC |
| --- | --- | --- |
| 10 | ACCOUNTING | NEW YORK |

In the above output of modified query Q5, three columns are displayed, which are deptno, dname, and loc, similar to the output from modified query Q2. However, in contrast to modified query Q2, since only the row for the ACCOUNTING department satisfies the condition expression of present policy p1, deptno=10, only the ACCOUNTING department row is displayed in response to modified query Q5.

Hardware Overview

Figure 2:
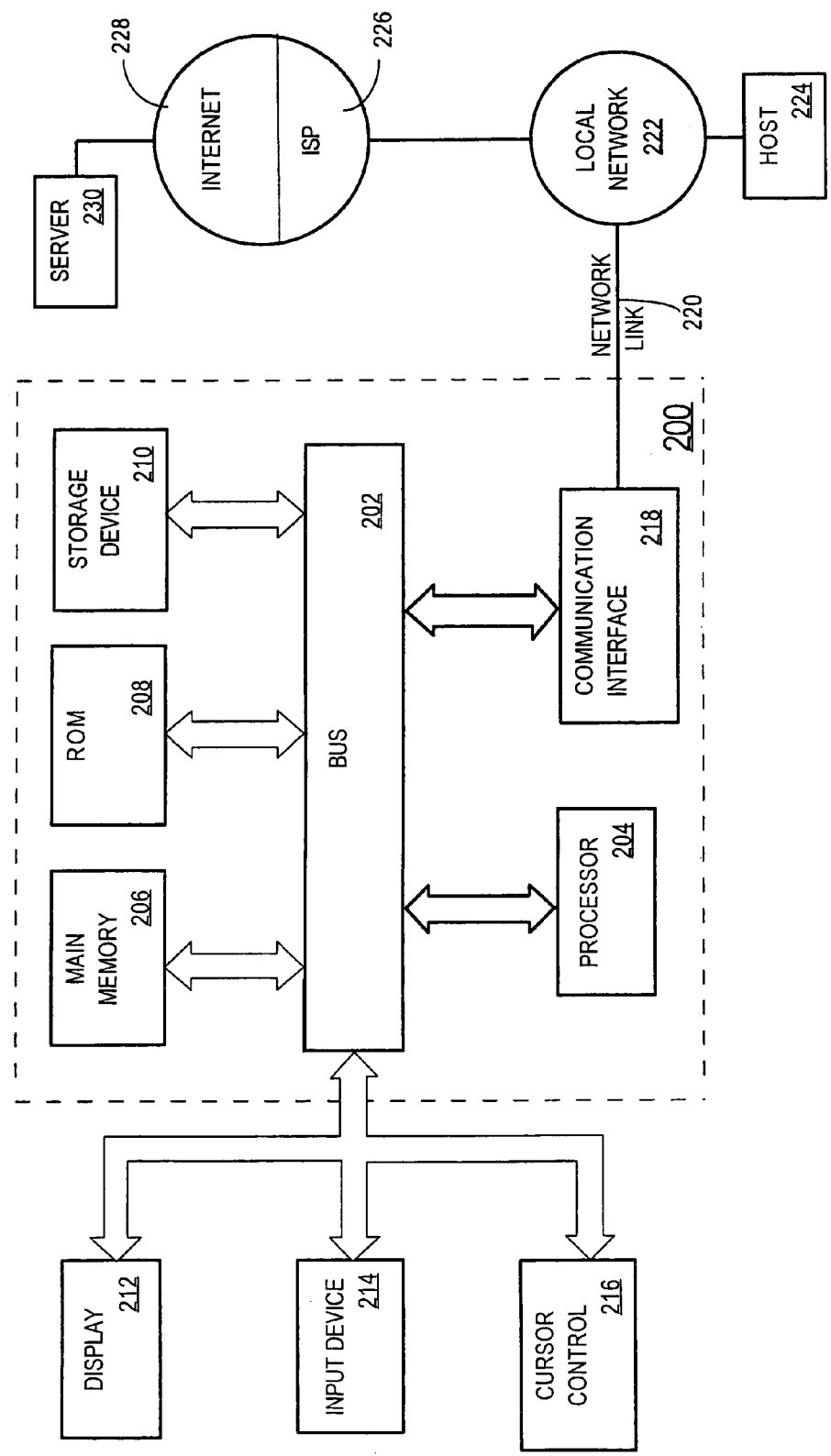
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. In an embodiment, client-side 102 and/or server-side 110 may reside on a machine such as computer system 200. In an embodiment, database 118 may be a machine such as computer system 200. According to one embodiment of the invention, the techniques described herein are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. The computer-readable medium is just one example of a machine-readable medium, which may carry instructions for implementing any of the methods and/or techniques (e.g., method 500) described herein. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for managing access to data, the method comprising the steps of:
   detecting that a database statement is issued;
   wherein said database statement requires access to at least one column in a table;
   invoking a policy function which database metadata associates with at least one column in a table;
   receiving an expression returned by invoking said policy function;
   rewriting said database statement by creating a modified database statement that incorporates said expression;
   wherein the modified database statement specifies, based on the expression, whether to mask a value of the at least one column by returning a mask of the value instead of the value; and
   executing said modified database statement.

2. The method of claim 1,
   wherein said database statement requests at least two values located in at least two columns;
   wherein each of the two values are located in a different one of the at least two columns; and
   wherein the step of executing the modified database statement includes at least
   returning at least one of the at least two values, and
   returning a masked value instead of at least a second of the at least two values.

3. The method of claim 1, wherein the expression is a condition expression.

4. The method of claim 1, wherein the masked value is returned for rows
   that are retrieved for the database statement issued,
   that do not satisfy the condition, and
   to which access privileges are granted.

5. The method of claim 1, further comprising:
   wherein said database metadata associates a list of one or more columns with a policy used for controlling access to the one or more columns; and
   wherein the step of rewriting is performed if a match is found between the at least one column to which the database statement requires access and the list of one or more columns.

6. The method of claim 1, wherein:
   said database metadata associates a list of one or more columns with a policy used for controlling access to the one or more columns; and
   the step of rewriting said database statement by creating a modified database statement is not performed if a match is not found between the list of one or more columns and the at least one column to which the database statement requires access.

7. The method of claim 1, further comprising:
   creating the policy function that returns a condition expression;
   wherein the step of creating the modified database statement includes incorporating the condition expression and the database statement into the modified database statement.

8. The method of claim 7, further comprising:
creating a policy referencing the policy function and specifying trigger columns that trigger implementing the policy.

9. The method of claim 1, further comprising registering the policy function with a database server, wherein the policy function returns a condition expression and the modified database statement is based on the condition expression.

10. A machine-readable storage medium carrying one or more sequences of instructions, which when executed by one or more processors, causes the one or more processors to perform a method comprising the steps of:
detecting that a database statement is issued;
wherein said database statement requires access to at least one column in a table;
invoking a policy function which database metadata associates with at least one column in a table;
receiving an expression returned by invoking said policy function;
rewriting said database statement by creating a modified database statement that incorporates said expression;
wherein the modified database statement specifies, based on the expression, whether to mask a value of the at least one column by returning a mask of the value instead of the value; and
executing said modified database statement.

11. The machine readable storage medium of claim 10,
wherein said database statement requests at least two values located in at least two columns;
wherein each of the two values are located in a different one of the at least two columns; and
wherein the step of executing the modified database statement includes at least
returning at least one of the at least two values; and
returning a masked value instead of at least a second of the at least two values.

12. The machine-readable storage medium of claim 10, wherein the expression is a condition expression.

13. The machine-readable storage medium of claim 10, wherein the masked value is returned for rows
that are retrieved for the database statement issued,
that do not satisfy the condition, and
to which access privileges are granted.

14. The machine-readable storage medium of claim 10,
wherein said database metadata associates a list of one or more columns with a policy used for controlling access to the one or more columns; and
wherein the step of rewriting is performed if a match is found between the at least one column to which the database statement requires access and the list of one or more columns.

15. The machine-readable storage medium of claim 10, wherein:
said database metadata associates a list of one or more columns with a policy used for controlling access to the one or more columns; and
the step of rewriting said database statement by creating a modified database statement is not performed if a match is not found between the list of one or more columns and the at least one column to which the database statement requires access.

16. The machine-readable storage medium of claim 10, wherein the steps further comprise
creating the policy function that returns a condition expression;
wherein the step of creating the modified database statement includes incorporating the condition expression and the database statement into the modified database statement.

17. The machine-readable storage medium of claim 16, wherein the steps further comprise creating a policy referencing the policy function and specifying trigger columns that trigger implementing the policy.

18. The machine-readable storage medium of claim 10, wherein the steps further comprise registering the policy function with a database server, wherein the policy function returns a condition expression and the modified database statement is based on the condition expression.

* * * * *